(12) United States Patent
Li et al.

(10) Patent No.: US 9,110,998 B2
(45) Date of Patent: Aug. 18, 2015

(54) HIERARCHICAL BEHAVIORAL PROFILE

(75) Inventors: Jianguo Li, Chicago, IL (US); Guohua Hao, Vernon Hills, IL (US); Paul C. Davis, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/334,222

(22) Filed: Dec. 22, 2011

(65) Prior Publication Data

US 2013/0166605 A1 Jun. 27, 2013

(51) Int. Cl.
G06F 7/00 (2006.01)
G06F 17/30 (2006.01)

(52) U.S. Cl.
CPC ............................. *G06F 17/30867* (2013.01)

(58) Field of Classification Search
CPC .............................................. G06F 17/30867
USPC .................................................. 707/733, 778
See application file for complete search history.

(56) References Cited

U.S. PATENT DOCUMENTS

| | | | |
|---|---|---|---|
| 5,727,129 A * | 3/1998 | Barrett et al. | 706/10 |
| 5,848,396 A * | 12/1998 | Gerace | 705/7.33 |
| 6,005,597 A | 12/1999 | Barrett et al. | |
| 6,701,362 B1 | 3/2004 | Subramonian et al. | |
| 6,727,914 B1 | 4/2004 | Gutta | |
| 6,769,066 B1 | 7/2004 | Botros et al. | |
| 6,801,909 B2 | 10/2004 | Delgado et al. | |
| 6,839,680 B1 | 1/2005 | Liu et al. | |
| 7,599,955 B2 | 10/2009 | Yoon et al. | |
| 7,620,894 B1 | 11/2009 | Kahn | |
| 7,801,896 B2 | 9/2010 | Szabo | |
| 8,185,487 B2 * | 5/2012 | Tuzhilin et al. | 706/47 |
| 8,335,803 B2 | 12/2012 | Abraham | |
| 2002/0184080 A1 | 12/2002 | Murad et al. | |
| 2003/0028871 A1 * | 2/2003 | Wang et al. | 725/9 |

(Continued)

FOREIGN PATENT DOCUMENTS

WO 2012136462 A1 10/2012

OTHER PUBLICATIONS

Li Niu et al: Product hierarchy-based customer profiles for electronic commerce recommendation, Proceedings of the First International Conference on Machine Learning and Cybernetics, Beijing, Nov. 4-5, 2002, pp. 1075-1079.

(Continued)

*Primary Examiner* — Cheyne D Ly
(74) *Attorney, Agent, or Firm* — Dority & Manning, P.A.

(57) ABSTRACT

In a hierarchical profile, each node represents at least one feature of behavioral data collected about an entity profiled, with the topmost node selected as the "statistically most informative" feature of the data. A profile can cover numerous domains and be predictively very powerful in each domain. A number of observations can be "aggregated" together into a single datapoint. In use, the structure of the profile is compared against current information associated with the entity to produce a recommendation or prediction. If the profile represents at least some data aggregation, then new observations are folded into the profile based on statistical weights of the aggregations. Because of the way the profile is created and updated, its hierarchical structure maps the collected observations. Therefore, as new observations are incorporated, if the new observations change the profile's structure significantly, then it can be hypothesized that something "interesting" has happened to the entity.

32 Claims, 10 Drawing Sheets

(56) References Cited

U.S. PATENT DOCUMENTS

| | | | |
|---|---|---|---|
| 2003/0078811 | A1 | 4/2003 | Cole et al. |
| 2003/0105658 | A1 | 6/2003 | Chen et al. |
| 2004/0249866 | A1 | 12/2004 | Chen et al. |
| 2005/0071328 | A1 | 3/2005 | Lawrence |
| 2005/0203884 | A1* | 9/2005 | Allen et al. ............... 707/3 |
| 2006/0218651 | A1 | 9/2006 | Ginter et al. |
| 2007/0053513 | A1 | 3/2007 | Hoffberg |
| 2007/0115979 | A1 | 5/2007 | Balay et al. |
| 2007/0130350 | A1* | 6/2007 | Alperovitch et al. ......... 709/229 |
| 2008/0005313 | A1 | 1/2008 | Flake et al. |
| 2008/0077614 | A1 | 3/2008 | Roy |
| 2008/0177721 | A1 | 7/2008 | Agarwal |
| 2008/0320553 | A1 | 12/2008 | Balay et al. |
| 2009/0234711 | A1 | 9/2009 | Ramer et al. |
| 2009/0234878 | A1 | 9/2009 | Herz et al. |
| 2010/0088151 | A1 | 4/2010 | Kim et al. |
| 2010/0122178 | A1 | 5/2010 | Konig et al. |
| 2010/0191582 | A1 | 7/2010 | Dicker et al. |
| 2010/0235908 | A1 | 9/2010 | Eynon et al. |
| 2010/0293221 | A1 | 11/2010 | Sidman et al. |
| 2013/0166494 | A1 | 6/2013 | Davis et al. |
| 2013/0166609 | A1 | 6/2013 | Hao et al. |

OTHER PUBLICATIONS

Weib, Diana et al.: "A User Profile-Based Personalization System for Digital Multimedia Content", Published in: Proceeding DIMEA '08 Proceedings of the 3rd international Conference on Digital Interactive Media in Entertainment and Arts, 2008, p. 281-288.

Bonnefoy, David et al.: "Final report about Applications and Services for the Individual Family Member, including updated specifications for personalisation technologies", MobiLife Wireless World Initiative, Information Society Technologies, IST-2004-511607 MobiLife, D20(D2.6) Version 1.0, Dec. 14, 2006, WP2 Final Report, all pages.

Aart, C Van et al.: "The NoTube Beancounter: aggregating user data for television programme recommendation", Proceedings of the Linked Data on the Web Workshop LDOW 2009, Madrid Spain, Publisher, Citeseer, pp. 1-12.

Suh, Youngiung et al.: "Context-based User Profile Mangement for Personalized Services", ubiComp workshop ubiPCMM (2005), publisher: Citeseer, all pages.

Berkovsky, Shlomo et al.: "Cross-Domain Meditation in Collaborative Filtering", Proceeding in UM'07 Proceedings of the 11th International Conference on User Modeling, 2007, Springer-Verlag Berlin, Heidelberg , 2007, all pages.

Alahakoon, Oshadi et al.: "Use of Buying Behavioural Characteristics in Long Term User Models", Information and Automation, 2006, ICIA 2006, International Conference on, Dec. 15-17, 2006, pp. 172-176.

Patent Cooperation Treaty, International Search Report and Written Opinion of the International Searching Authority for International Application No. PCT/US1012/067677, Apr. 4, 2013, 8 pages.

Patent Cooperation Treaty, "PCT Search Report and Written Opinion of the International Searching Authority" for International Application No. PCT/US 12/67678 dated Apr. 8, 2013, 9 pages.

Gao "Constructing User Behavioral Profiles Using Data-Mining-Based Approach" dated 2005; [retrieved on Mar. 7, 2013] Retrieved from the Internet URL: http://arizona.openrepsoitory.com/arizona/bitstream/10150/195843/1/azu__etd__1261__sip1__m.pdf; all pages.

United States Patent and Trademark Office, "Non-Final Rejection" for U.S. Appl. No. 13/344,242 dated Jul. 2, 2013, 12 pages.

United States Patent and Trademark Office, "Final Rejection" for U.S. Appl. No. 13/344,242 dated Jan. 13, 2014, 13 pages.

United States Patent and Trademark Office, "Non-Final Rejection" for U.S. Appl. No. 13/334,292 dated Feb. 3, 2014, 8 pages.

Kim et al., "Personalized Ranking of Search Results with Learned User Interest Hierarchies from Bookmarks" WEBKDD, 2005, 20 pages.

Markov et al., "Web User Profiling" 2005, 15 pages (http://uhaweb.hartford.edu/compsci/ccli/projects/UserProfiling.pdf).

\* cited by examiner

| 418 | Define a termination criterion for use when comparing with the hierarchical profile. |

| 420 | Perform the loop of steps 410 through 414 of Figure 4b as long as "perfect" matches are found. |

| 422 | Search the hierarchical profile for a "next-best" match (either a node or a combination of nodes) for the selected feature of the current context. |

| 424 | Perform an action based on the "next-best" match of the hierarchical profile. |

FIG. 4c

600a Detect the fact that a hierarchical profile for an entity has changed.

600b Detect a change in a statistical weight of a node of the profile.

600c Detect a change in a value of a feature in the profile.

600d Detect a change in the hierarchical structure of the profile.

600e Detect a replacement of two former features with a combination of the features in the profile.

602 Based on the detecting, perform an action with respect to the entity profiled.

FIG. 6

HIERARCHICAL BEHAVIORAL PROFILE

CROSS-REFERENCE TO RELATED APPLICATION

The present application is related to U.S. patent applications 13/334,242 and 13/334,292 filed on an even date herewith.

FIELD OF THE INVENTION

The present invention is related generally to personal computers and, more particularly, to profiling behavior of computer users.

BACKGROUND OF THE INVENTION

As personal communications devices (e.g., cell phones) are developed to support greater and greater functionality, people are using them to do much more than talk. As is well known, these devices now usually allow their users to access web sites, to run web-based applications, to create media files (e.g., by taking a picture or by recording a video using a camera on the device), and to download media files from remote servers (via a web interface supported by the device). In the course of pursuing these activities, a user generates an enormous amount of information about his preferences and behaviors. Some of this information is explicitly generated when the user sets preferences in a profile. Other information may be implicit, such as the frequency with which the user runs a particular application.

Advertisers and other commercial entities realize how valuable this information, both explicit and implicit, can be. (Of course, entities other than businesses collect behavioral information about entities other than potential customers, but this example serves well to motivate the present discussion.) As advertisers look beyond "traditional" media (e.g., magazines and television) to "new media" (e.g., online and mobile services) in order to increase the effectiveness of their advertising campaigns, the advertisers would like to personalize messages directed to a particular user. If the personalization is based on real information about the user's likes and dislikes, then, in theory at least, the personalized message can be more meaningful to the user than the traditional generic messages broadcast to everyone. For example, a retailer could direct messages to a user who is actively searching for information about products similar to ones that the retailer sells. This allows the retailer to tap into the needs of people prepared to buy rather than, as in the traditional approach, blindly sending advertisements to people who are simply watching television or reading a print medium.

Several technologies have been developed to gather customer information. Web browsers, for example, often track a person's searches and report the search queries to businesses that may provide the products that the person is searching for. It is a common experience to search the web for, say, "snow blowers," and then see pop-up advertisements for snow blowers just a few seconds after the initial search. Buying habits are also tracked in the check-out lane of the local grocery store, and that information is used to present very specific coupons to the customer along with his receipt. The gathered information is constantly fed to businesses so that the businesses can refine their offerings, locate potential future markets, direct advertising to likely candidates, manage inventory, and the like.

As information is gathered about a particular person, a "profile" of that person is created. From a commercial entity's point of view, the more information fed into a person's profile, and the greater the specificity of that information, the better. To better tailor incentives, a provider of streaming movies would like to know that a given person likes watching westerns but would also like to know that this person only watches westerns after 9 p.m. on weekdays when his little children have gone to sleep.

This example begins to hint at the enormous amount of information that is potentially available to be gathered into a person's profile. To control this huge amount of information, the personal profile is carefully constructed. As is well known, each information sample can be plotted as a point in a multi-dimensional space. The dimensions in the space represent features of a data sample (e.g., where was the user when this sample was collected? how old was he? what was he doing? whom was he with?). The position along a dimension represents the value of that feature. This type of structure makes it relatively easy to "find" the person's preferences in the multi-dimensional space and, from those preferences, to produce reasonably accurate recommendations.

This multi-dimensional way of representing a personal profile has problems, however. There are so many potential features and so many values of those features that the resulting profile begins to consume huge amounts of storage space, creating cost and maintenance problems that only increase as the amount of data gathered for a particular person increases and as the number of persons profiled increases. Also, a traditional personal profile may only cover one domain of the person's activities (e.g., media consumption), making the profile useless for predictions outside that domain. In a related development, even though these profiles may be very large, they are often, from a statistical viewpoint, very "sparsely populated" because they may have only a few datapoints located along any given dimension. This severely limits the predictive power of the profile.

BRIEF SUMMARY

The above considerations, and others, are addressed by the present invention, which can be understood by referring to the specification, drawings, and claims. The present invention collects behavioral data and creates a hierarchical profile for an entity. The profile can be imagined as shaped like a pine tree with one node at the highest preference level and one or more nodes at each lower level. Each node represents at least one feature of the collected behavioral data, with the topmost node selected as the "statistically most informative" feature of the data. Lower level nodes are arranged in a descending order based on their relative "informativeness." The hierarchy can be extended to lower and lower layers until a "coverage criterion" is satisfied. The criterion can state, for example, that the profile is satisfactory when a certain amount of the collected behavioral observations are included in the profile or when the profile includes a given number of preference levels.

The behavioral observations collected can include passive usage data, preferences explicitly stated by the entity or by some other body, contextual information, and statistical data. The collected behavioral data can be filtered so that the resulting profile covers a single domain. On the other hand, by including as many behavioral observations as possible, a profile could be made that covers numerous domains and that is predictively very powerful in each domain because of the large number of observations that it is based upon.

The entity profiled need not be a person. It can be a group (however defined) of persons, a corporate entity, or even a data entity as defined by a collection rule (e.g., a genre of movies). Using the data analysis techniques of the present invention, some embodiments can even choose the most appropriate entity to profile, given the observational data set.

In some situations, a number of behavioral observations can be "aggregated" together into a single datapoint. A single node may represent a number of features or a statistical aggregation of behavioral observations. Aggregation may result in some data loss but at the gain of significantly reduced storage requirements. In other situations, all of the behavioral observations are kept.

In use, the hierarchical structure of the profile is compared against current contextual (and other) information associated with the entity. The structure of the profile leads directly to the statistically most likely course to follow in making a recommendation, predicting an outcome, or mapping a behavioral pattern for the entity. As stated above, if the profile was created with data from multiple domains, then it is useful in all of those domains and possibly even in new domains, given a large amount of observational data and a certain consistency (verifiable through analysis of the weights in the profile) of action on the part of the entity. For example, even if there have been no observations of a person's music preferences while driving, the profile may be able to recommend music to play while the person is driving, based on the musical preferences of the person when not driving and on observations of what the person usually does when driving.

The profile is constantly updated as new behavioral observations become available. If all of the observations have been kept, then the procedure originally used to create the profile can be repeated to update it. More interestingly, if the existing profile represents at least some data aggregation (and thus some data loss), then the new observations can be effectively folded into the existing profile based on the statistical weights of the aggregations. The new observations may cause the profile to be modified in the statistical weights assigned to its nodes or even in the very structure of its hierarchy.

Because of the way the profile is created and updated, the structure of the hierarchy is a map of the collected observations. This fact can be used in an intriguing way: As new observations are made and are incorporated into the profile, if the new observations change the structure of the profile significantly, then it can be hypothesized that something "interesting" may have happened to the entity. Thus, detecting a change in the profile can trigger an action such as sending an advertisement or other notification to the entity or initiating a review of the entity's file. As an example, if a person has been observed purchasing more "upscale" goods recently, then that person's investment broker may be inclined to call the person to see if his investment policy should be reconsidered.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 4c is a specific example of the method of FIG. 4a used when "perfect" matches are not always found;

FIG. 6 is a flowchart of a representational method for responding to a change in a hierarchical profile.

DETAILED DESCRIPTION

Figure 1:
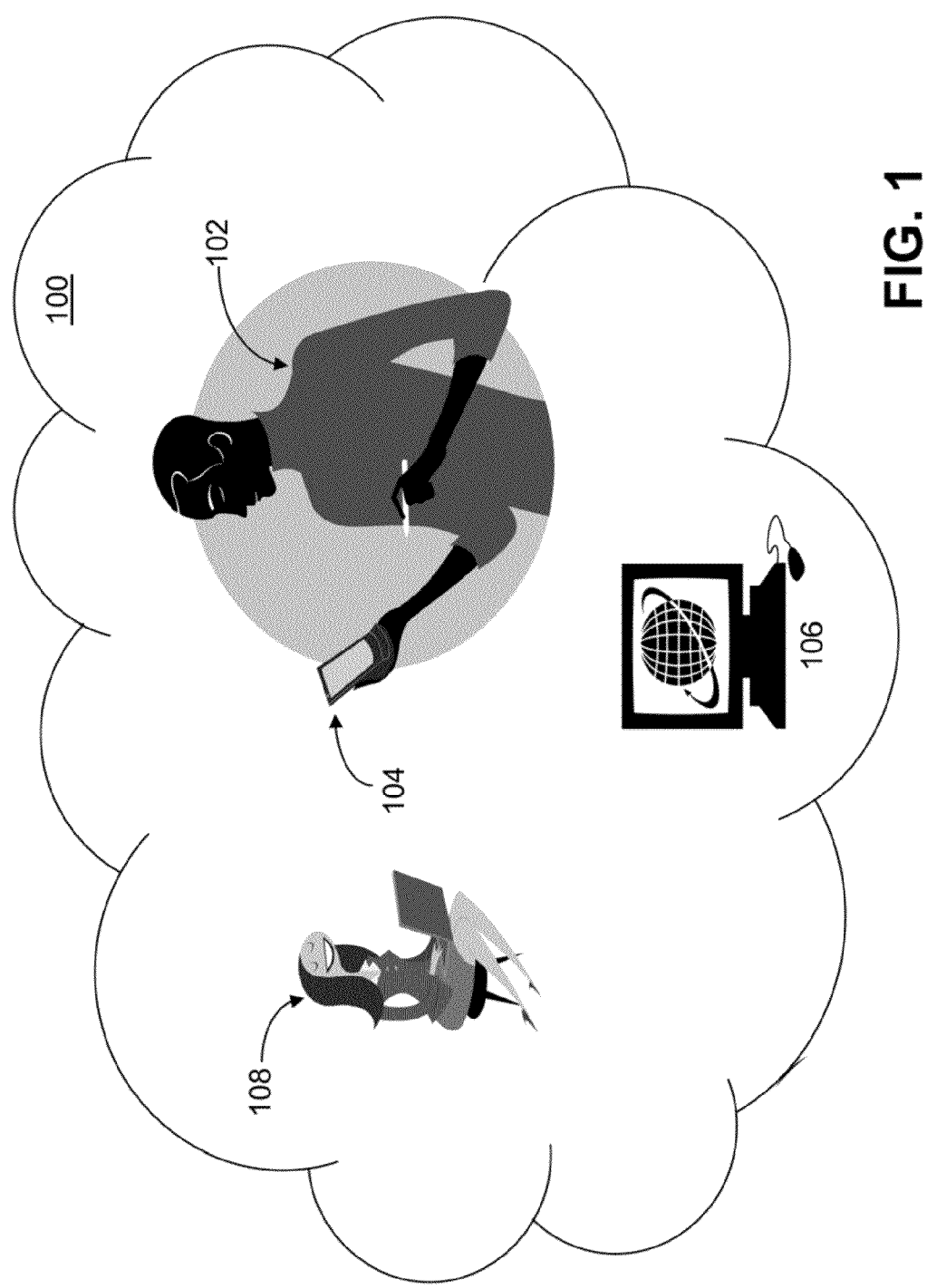
FIG. 1 is an overview of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Aspects of the present invention may be practiced in the representative communications environment 100 of FIG. 1. A user 102 uses his communications device 104 to perform various tasks such as accessing web sites 106, communicating with a friend 108, running web-based applications for work or pleasure, shopping, and recording health information. While pursuing these activities, the user 102 generates information about his behaviors, preferences, health status, and social contacts. Some of this information is explicitly generated when the user 102 sets preferences in a profile. Other information may be implicit, such as the frequency with which the user 102 runs a particular application or communicates with a certain person. Other information about the user's activities and preferences may be generated through the user's interactions with devices other than his communications device 104. For example, a GPS unit in his car can find and record his current location and speed. A set-top box in the user's home (or the head-end serving that set-top box) may record the user's viewing choices.

This information can be of interest to the user 102 himself as well as to numerous commercial and private entities. For example, an advertiser may like to use this information in order to tailor an advertising campaign to the specific needs and preferences of the user 102. A restaurant owner may wish to recommend restaurants that lie near a route that the user 102 often drives. This information can also be used to recommend music to play to the user 102 on the communications device 104.

Figure 2:
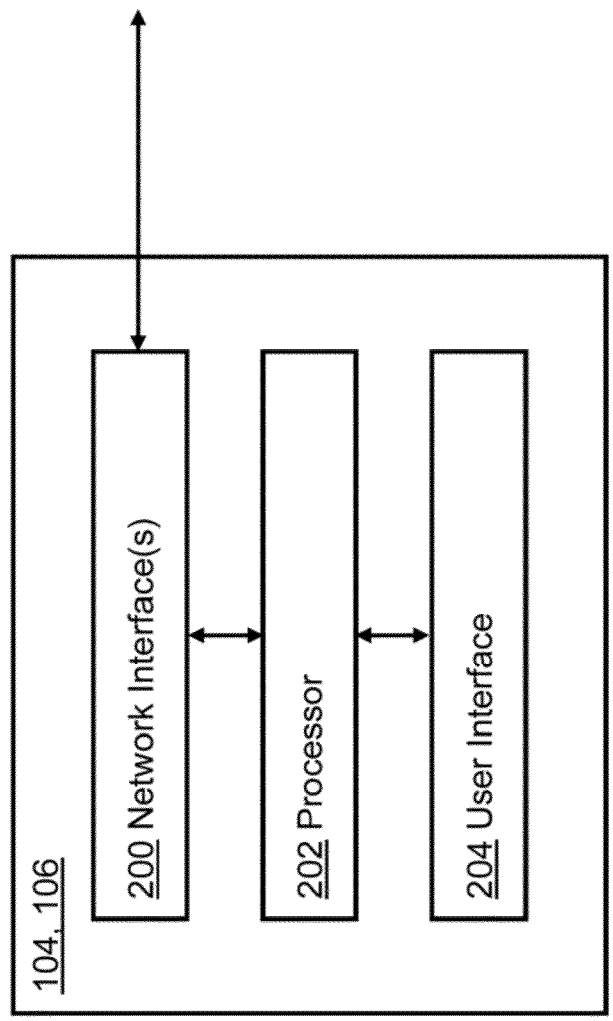
FIG. 2 is a generalized schematic of some of the devices shown in FIG. 1.

FIG. 2 shows the major internal components of a representative communications device 104 (e.g., a mobile telephone, personal digital assistant, tablet computer, or personal computer) or server 106. Network interfaces 200 send and receive media presentations, related information, and download requests. A processor 202 controls the operations of the device 104, 106 and, in particular, supports aspects of the present invention as illustrated in FIGS. 3 through 6, discussed below. The user interface 204 supports a user's (or administrator's) interactions with the device 104, 106. A typical user interface of the communications device 104 includes a display, a keypad, and other user-input devices. The keypad may be physical or virtual, involving virtual keys displayed on a touch screen. Specific uses of these components by specific devices are discussed as appropriate below.

Figure 3A:
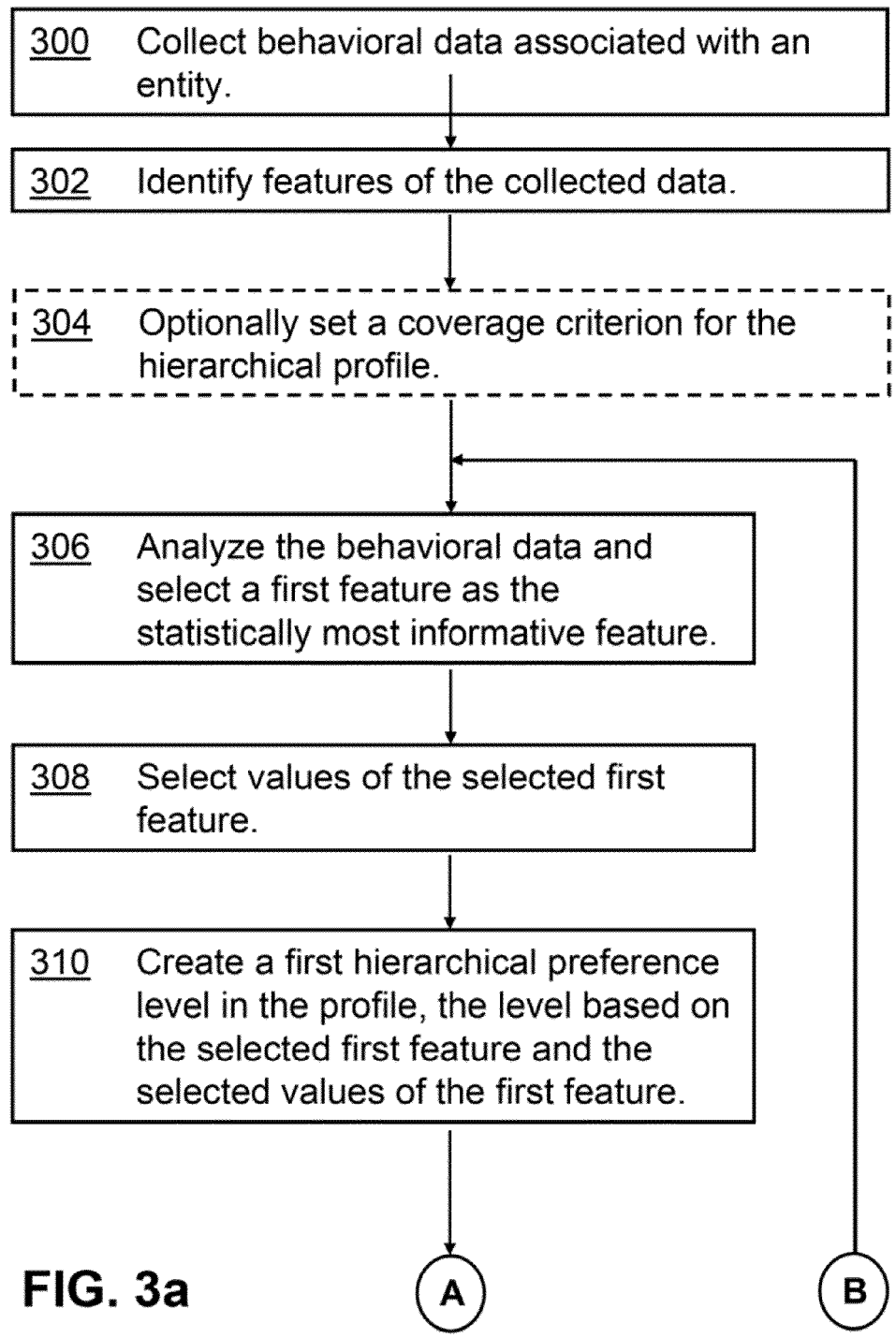
FIGS. 3a and 3b together form a flowchart of a representational method for creating a hierarchical profile for an entity.

FIG. 3 presents a method for creating a hierarchical profile according to aspects of the present invention. (Note that the flowcharts of FIGS. 3 through 6 are primarily intended to support the following discussion. The "steps" in the flowcharts are, in some embodiments and in some situations, optional and may be performed in a different order, if at all.) The method begins at step 300 of FIG. 3a where behavioral information is gathered about the entity to be profiled.

As mentioned above, just about any information can be useful, from explicitly stated preferences or ratings of experiences, to passive usage and contextual data, to statistical aggregations of observational or other data (e.g., demographic information). As is made apparent from the following discussion, the more observations and the more types of observations made, the stronger the predictive power of the resulting hierarchical profile.

In the past, behavioral data were often filtered by a contextual attribute so that, for example, the resulting profile only reflected observations about movie-viewing behaviors. This is important in some prior art profiling techniques because those techniques become very inefficient when confronted with a large number of observations sparsely covering very large contextual domains. While this type of filtering may be applied here, it can be more useful to accept observations from many contexts. The structure of the resulting hierarchical profile helps to make sense of observations from many disparate domains.

A word about the "entity" being profiled is appropriate here. For the sake of concreteness in the present discussion, the profiled entity is usually considered to be the user 102 of FIG. 1. Other types of entities are possible and potentially useful, however. The profiled entity can be a corporate body, a social network, or any definable group of persons. The group of persons profiled can be defined by a shared contextual attribute (as is often used in advertising). Such a grouping may be more interesting to an advertiser than a profile based on an individual person because many more observations may be available about the group than about any particular member of the group. Thus, the characterization of the group (and of its behavioral responses) may be more accurate than the characterization of any one of its participants. The entity may also be restricted by a contextually defined subset of observations about a user, social network, or any definable group of persons, for example, the entity may consist of a given user as he is observed only on weekdays or only when he is in an automobile.

In some embodiments, the entity is defined by a collection rule, that is, a rule defining what observational data are appropriate to the entity to be profiled. Thus, the entity can itself be defined by the data-collecting process. A useful application of this is discussed below in relation to step 320 of FIG. 3b.

In step 302, features are identified in the collected observations. A "feature" is a variable that can take a value. For example, the "feature" of "where was the user when this observation was taken?" can take the value "in his car" or, more informatively, "in his car on Interstate 90 at mile 250 heading toward work." Generally, a single observation is a collection of features and values. Different observations will contain different features and different values of those features. A large part of the challenge of effective profiling is handling observational data when the feature set can vary largely from one observation to the next. Note that some observations are limited in their "feature-richness" by the sensors available when the observations were made. It would often be useful to know, for example, the identities of other persons near the user when an observation was made (especially when a movie is selected for viewing, for example), but that type of social-presence information may not always be available.

A "coverage criterion" for the hierarchical profile under construction is optionally set in step 304. It is discussed below in relation to step 312 of FIG. 3b.

The computational analysis needed to structure the hierarchy of the profile begins in earnest in step 306. The observational data set is analyzed and, of the features identified in step 302, the statistically most informative feature is identified. The mathematics behind this step are well known to experts, but a simple example may help to illuminate the present discussion. If a profile is being created to answer the question: "Does this user often wear a dress to work?," then the features "hair color" and "height" are probably not going to be very informative. The user's gender would be expected to be much more informative, as would the nature of the user's job. In order for the resultant profile to be most generally useful, however, it is not created to answer a specific question (or even a specific class of questions). Even with that amount of generality, known mathematical techniques are available for use in step 306.

Using the selected feature from step 306, in step 308 values of the feature are selected. Generally, the statistically most informative values of the selected feature are selected here. Another simple example should help. Consider the query: "What is the user's most probable hair color?" If the selected feature were "country of origin," then the values of that feature "China," "Japan," "Kenya," and "Norway" are expected to be statistically informative for answering that query, while "United States" and "Australia" are not (due to the extreme racial mixing in the latter two countries as compared with the first four).

With the statistically most important feature and the values of that feature selected, the first preference level of the hierarchical profile is created in step 310. The significance of the procedure of FIG. 3 can begin to be seen, at least in part. (This should become clearer in the discussion of FIGS. 4 and 6 when the completed profile is used.) Although specific queries are used in the discussion above to clarify some concepts, these queries are not used when creating the hierarchy. That is, the hierarchy does not reflect pre-assumptions of the queries that will be directed to the resultant profile; rather, the hierarchy reflects deep aspects of the observational data set itself. Thus, the resultant profile captures the overarching "meaning" of the behavioral observations across all domains and is thus useful in answering queries from any domain or about cross-domains. Also, by "rooting" the hierarchical structure of the profile with the statistically most informative feature, comparisons against the profile can be quickly made (see the discussions related to FIG. 4 below) even if the profile represents an enormous and ever growing number of disparate observations. Where the "meaning" of behavioral data differs across different domains (or differs beyond what is permitted by a statistical threshold), then the domain itself can be used as an additional contextual feature in the profile. In this manner, the "meaning" in different domains can be captured in the profile as needed. The process of incorporating domain information within a profile can happen as observations are processed that cover multiple domains or through an additional process in which profiles from separate domains are merged, identifying the statistically most informative features when domain information and the relevant domain-specific profiles are included. (See the discussion accompanying FIG. 7 below.)

Figure 3B:
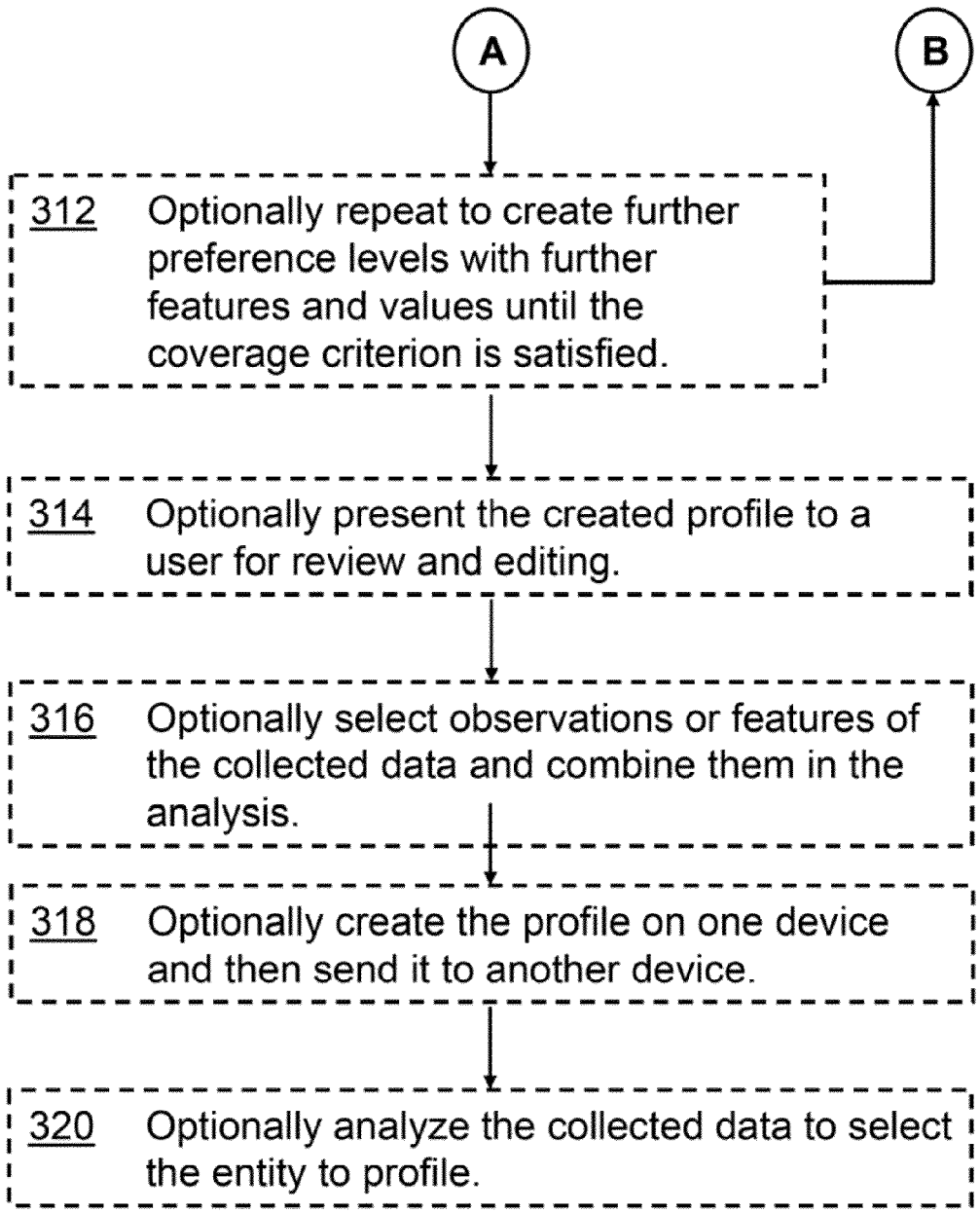

In step 312 of FIG. 3b, the coverage criterion, if set in step 304 of FIG. 3a, is checked. If the coverage criterion is not yet satisfied, then the procedure continues by returning to step 306 of FIG. 3a to create the next preference level of the hierarchical structure of the profile. In the first traverse of the loop of steps 306 through 312, the statistically most informative feature was selected. Now, the next-most informative feature is selected. By continuing in this way, the evolving hierarchy begins to resemble a tree, with each node representing features in the observational data set less statistically informative than the ones above it.

Lower and lower levels are added to the hierarchy until the coverage criterion is satisfied. One possible coverage criterion is the straightforward "continue until all of the observations [collected in step 300 of FIG. 3a] are represented in the hierarchy." With a very sparse data set, however, this criterion can lead to a very large number of increasingly irrelevant (i.e., not very informative) levels in the hierarchy. Other possible coverage criteria are "continue until a certain amount of the observations are represented in the hierarchy" and "continue until the hierarchy has a certain number of levels." A more sophisticated coverage criterion analyzes the resultant profile as it grows and then stops the procedure when the addition of further levels is expected to represent a gain in "predictiveness" of the final profile that is below a threshold value. When the hierarchy is not extended to represent every single observational feature, the remaining features can be statistically aggregated into the profile. Thus, the procedure can intelligently perform a lossy compression of the behavioral data, ensuring that the statistically most informative features of the observational data set are maintained.

Optional step 314 represents the fact that profiled user 102 may be more informative even than the observational data collected about him. That is, he may be able to add information to the profile (e.g., by setting a rule at a given node) that makes the profile more predictive but that was not reflected in the observational data set.

Optional step 316 represents a number of refinements that would generally be applied during the creation of the profile (that is, during the loop of steps 306 through 312), rather than at the end of the procedure. Based on an analysis of the data, a node in the profile may represent a statistical aggregation of collected behavioral data. For example, a number of observations may be statistically combined and the combination represented in the profile rather than all of the individual observations. This makes the profile more usable by reducing its size, though possibly with some data loss.

Also at step 316, a statistical analysis could show that two features of the data set are comparable and that they have a significant degree of overlap. Combining these two features into one node (rather than allowing them to remain in separate nodes) could increase the statistical power of these particular observations and not let their information be "diluted" among the other observational features.

Optional step 318 emphasizes that the profile may be created on one device and then sent, in whole or in part, to another device for use. A web server 106, for example, may have access to behavioral observations collected by many devices. The server 106 may have enough space and processing power to incorporate all of its collected observations into a very comprehensive hierarchical profile. It can then send a summary profile, or a profile optimized for decisions within a particular domain or for a particular entity, for use on a device with more limited capabilities (e.g., the user's communications device 104).

In optional step 320, the observational data set is analyzed in an effort to determine which entity should be profiled. Normally, the entity is selected upfront, and observations are collected about that entity. Here, observations are collected and statistically analyzed to see if the data set points to a particular entity that is being reflected in the observations. When a large number of observations are available, particularly including observations made over many domains, the data set may be able to reveal hitherto unknown entities. For example, a thorough analysis may reveal the existence of a social group and the people in it. Having extracted knowledge of this group, the profile can be created to reflect the particular interests of that group.

Figure 4A:
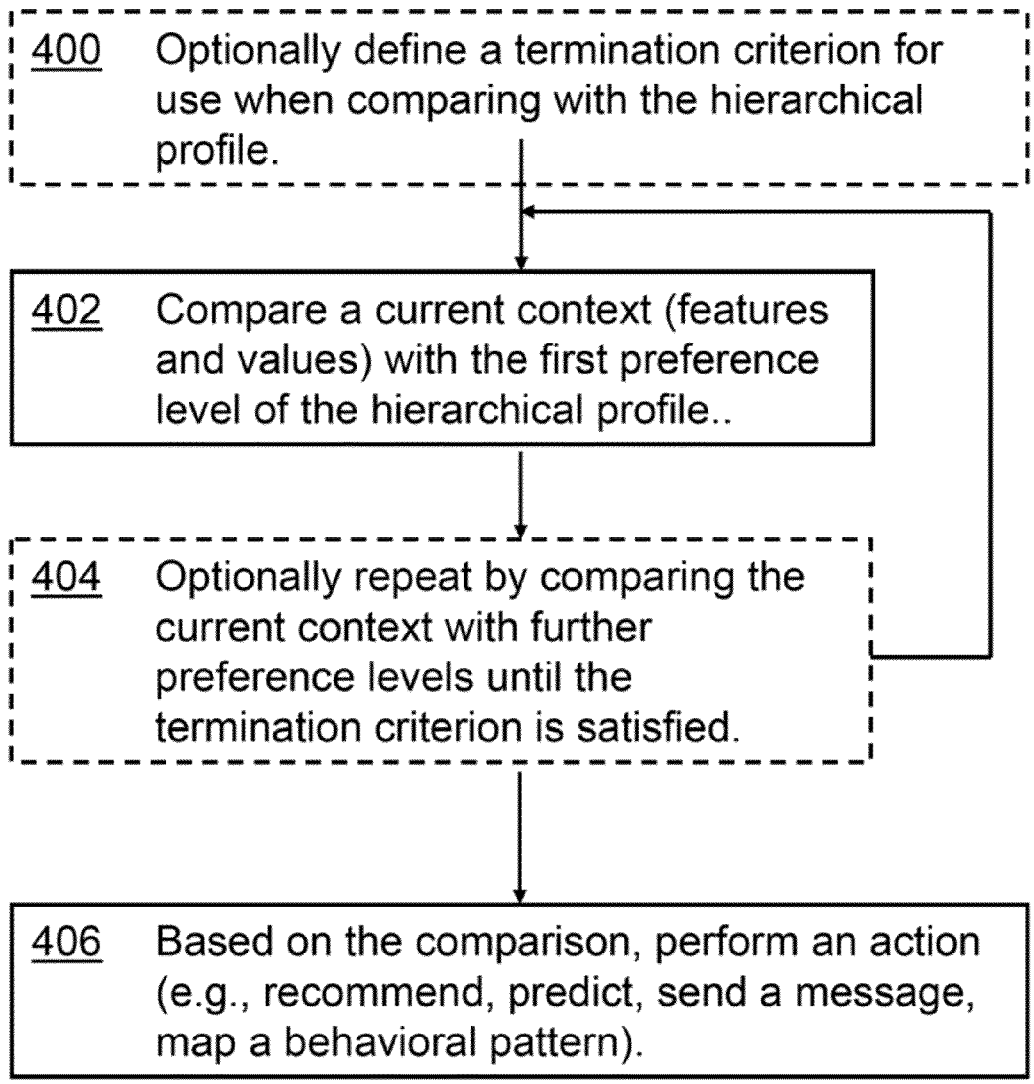
FIG. 4a is a flowchart of a general method for using a hierarchical profile when performing an action.
Figure 4B:
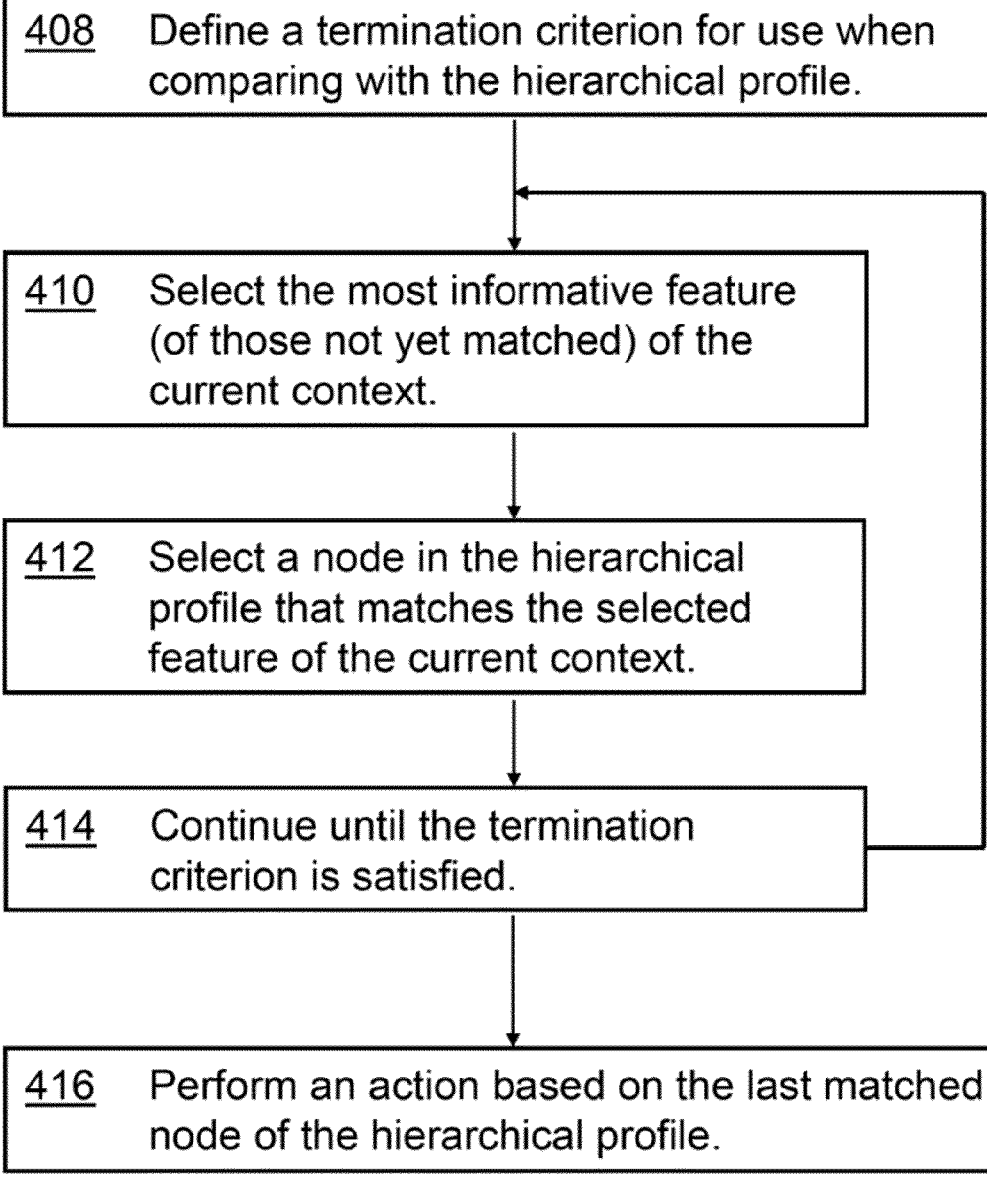
FIG. 4b is a specific example of the method of FIG. 4a used when "perfect" matches are always found.

Having created the hierarchical profile, FIG. 4 presents representative methods for using it. FIG. 4a is very general and is used to introduce a few useful concepts. FIGS. 4b and 4c are more specific and detailed, showing what can happen in particular situations.

The method of FIG. 4a begins in step 400 where a termination criterion is optionally defined. This criterion is discussed below in relation to step 404.

Information about the current context is gathered in step 402. As with the behavioral observations that went into the creation of the profile, the current context consists of feature/value pairs. For example, a context can include the following three feature/value pairs: (where? in my car driving to work), (when? Monday morning), (with whom? my dog). Note that many other features and values are possible, but that in a given context, the list will often be limited by the types of sensors available to collect the data. The features and values known in the current context are compared against the hierarchical profile, beginning at the top preference level of the profile. (Specifics of this process, which can vary with the context and with the coverage of the profile, are considered in the discussions of FIGS. 4b and 4c below.)

The comparison of the current context with the hierarchical profile can continue level by level in step 404 until the termination criterion is satisfied. The termination criterion can state that the comparison continue, for example, until all features of the current context are matched, or until a certain fraction of them are matched, or until a certain level in the hierarchy is reached.

In any case, once the comparison stops, the node reached in the hierarchy is the one most informative, given the information contained in the current context. Based on that node, an action is performed in step 406. The action may be, for example, recommend a song to the user, send a message to the user (e.g., an advertisement), predict that the user is likely to perform a certain action sometime in the near future, classify a user behavior as being a certain action, or map a pattern of the user's behavior. In some of these examples, the action performed, based on the comparison of the entity's current context to the hierarchical profile, is directed to the entity itself. However, in several other examples, the action performed is not directed to the profiled entity at all. Instead, it may be directed to someone interested in the profiled entity (e.g., an advertiser) or to someone trying to predict large-scale social patterns.

FIG. 4b presents a more detailed version of the general method of FIG. 4a. In the method of FIG. 4b, "perfect" (or near enough) matches can always be found. (This is explained below in relation to step 412). The procedure begins in step 408 where a termination criterion is set.

The comparison of the current context with the hierarchical profile begins in step 410. The most information feature of the context is selected. The context itself does not specify which of its features is most informative. Instead, this information comes from the profile. Recall that the profile was created from the top down starting with the most statistically informative feature of the collected behavioral data set (step 306 of FIG. 3a). That information is now used when reviewing the features in the current context. Consider the example from FIG. 4a where the current context is: (where? in my car driving to work), (when? Monday morning), (with whom?

my dog). When the task at hand is automatically selecting and rendering media content to the user 102, a review of the hierarchical profile may reveal that the most informative of the three features in the current context is the "where?" feature. Clearly, the media selected for the user 102 should not include movies when he is driving. In step 412, the node in the hierarchical profile that matches this "where?" feature is found. Note that although "where?" is the most informative feature of the current context, it need not be the most informative feature of the profile. The profile may, and usually will, reflect many more features than are contained in any particular context.

Step 412 is described above as finding the node that "matches" the selected feature in the current context. Sometimes a perfect match exists. In other situations, the match may not be perfect, but is close enough (e.g., within a set threshold) for use by the method of FIG. 4b. If even that type of match is not possible, then the procedure of 4c can be used.

The termination criterion is checked in step 414. The same types of criteria as discussed above in relation to step 404 of FIG. 4a can be applied. If the termination criterion is not yet satisfied, then the procedure goes back to step 410, and the hierarchical profile is examined below the node selected in step 412 until a match is found for the next-most informative feature of the current context. Continuing with the above example, the "when?" feature may not be very informative at all (the user's tastes do not depend upon the time of day), but the "with whom?" feature may be. The structure of the hierarchical profile shows that while the user 102 will listen to just about anything, the user's dog is a notorious blues hound and cannot abide easy-listening radio. A node matching the "with whom?" feature is found in the profile.

In this example, the termination criterion is now satisfied because all three features of the current context have been considered (two are matched in the profile, and "when?" is ignored as uninformative). The procedure moves to step 416.

In step 416, an action is performed based on the last matched node in the profile (as in step 406 of FIG. 4a). In this example, the car's stereo begins to play Bessie Smith's "Downhearted Blues™."

FIG. 4c is another specific example of the general method presented in FIG. 4a. This figure presents possibilities that may be taken when a "perfect" match cannot be found.

The method of FIG. 4c begins, as do the methods of FIGS. 4a and 4b, by optionally setting a termination criterion in step 418. In step 420, just as in the method of FIG. 4b, the most informative features of the current context are matched one by one with nodes in the hierarchical profile. This continues in a loop until a feature of the current context is considered for which no "perfect" match can be found. (If "perfect" matches are found in step 420 until the termination criterion is satisfied, then, in this specific situation, the method of FIG. 4c becomes identical to the method of FIG. 4b.)

Step 422 is entered when the distance between the contextual feature currently under consideration and the closest node in the hierarchical profile is greater than the threshold discussed above in relation to step 412 of FIG. 4b. Several actions are possible at this point. In a first example, the node in the profile that is nearest to the contextual feature currently under consideration is selected. This action has the problem that it may take a while to find the nearest node. In a second example, the first node in the profile that is found to be within a second threshold of the contextual feature currently under consideration is selected. While this may not be the nearest possible match, it may be found quicker than the nearest possible match.

In a third possible action to take in step 422, a combination of nodes is found in the hierarchical profile that together come close to the contextual feature currently under consideration. The structure of the profile makes finding such a combination of nodes straightforward.

Regardless of which "next-best" action is applied in step 422, the "next-best" match is used in step 424 to perform some action, just as in the two previous examples of FIGS. 4a and 4b.

In some embodiments, the use of a "next-best" match can trigger further action on the part of the creator or user of the hierarchical profile. A sophisticated user may be given a confidence score that measures the level of certainty that the action taken in step 424 is the correct one, given the imperfect match of the current context with the hierarchical profile. The creator of the profile can respond to the "next-best" match condition by collecting further behavioral information to enhance the profile and possibly prevent the need to use a "next-best" match in the future.

Note that in an actual embodiment, the methods of FIGS. 4a, 4b, and 4c could all be performed in a single, complicated procedure. The methods are separated here for ease of discussion.

Note also that the constructed hierarchical profile can be used in additional ways that do not require traversal of the hierarchy. For example, the information in a profile can, in addition to being matched with a context, be used to retrieve values for an entity for a given feature. Those versed in the state-of-the art will recognize that for such feature-specific access, traversal of the profile is only one option for accessing feature values. Other techniques such as creating additional indices into the profile are well known and could provide for fast access when values for single features are needed for entities.

Figure 5:
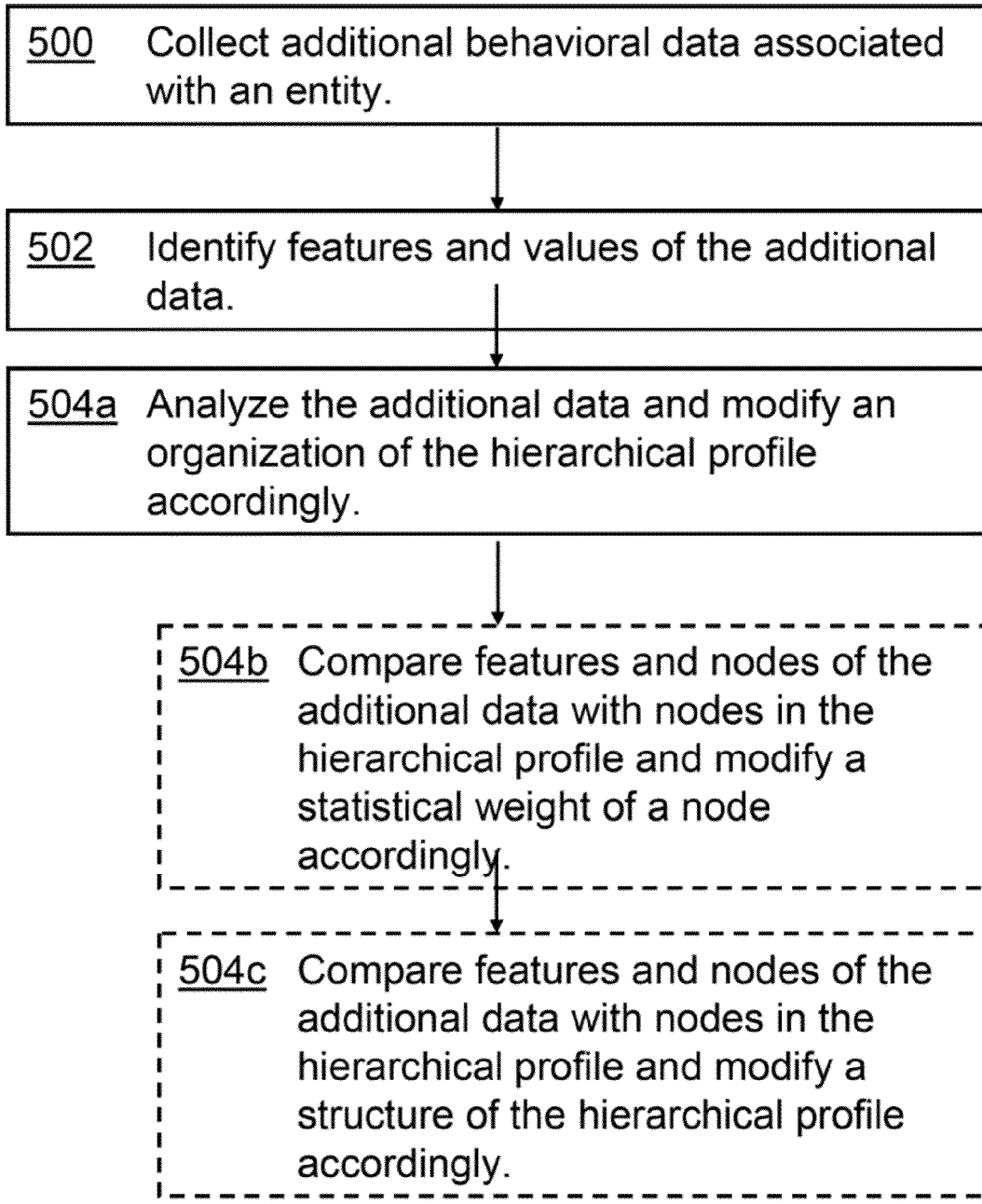
FIG. 5 is a flowchart of a representational method for modifying a hierarchical profile when additional behavioral data become available.

The hierarchical profile, once created by the method of FIG. 3, is generally not expected to remain static. As more observations become available, they can be used to update the hierarchical profile. FIG. 5 presents a method for doing just that.

The method begins in step 500 when more observations are collected. These can be of the same type as in the observational data set that was used when creating the hierarchical profile in the first place (see the discussion of step 300 of FIG. 3a). It is also possible that new types of observations become available as, for example, when new sensors (hardware or software) are deployed or when the user 102 begins to use new applications or visits new web sites.

As with the original observations, the new observations consist of feature/value pairs. These are identified in step 502.

The new observations are analyzed in step 504a and fed into the hierarchy. There are several ways of proceeding here. If all of the original observational data have been preserved, then the new observations and the older observations can be put into a single data set. That data set is then used in a repetition of the creating method of FIG. 3. That is, the existing hierarchical profile can be simply discarded and then a new one created using all of the observational data available to date.

(It is perhaps obvious, but should be noted that the phrase "all of the observational data available to date" may be a euphemism. In many situations, observations are time-stamped, and the oldest observations are discarded as potentially no longer relevant due to age or to changed circumstances of the profiled entity. A given observation may also be superseded by a subsequent observation. Some observations may be found to be spurious or misleading upon examination or comparison with other observations. Thus, the phrase is more accurately given as "all of the observational data available to date that have not been discarded for one reason or another.")

This simple method of recreating the profile may produce the most accurate profile, given all of the existing data, but it is often unfeasible. A first reason is, it depends upon the fact that all observations have been kept. In a world where the amount of observational data is skyrocketing, it may not be feasible to keep all of it, even for an enormous corporate entity with large server and storage farms. This consideration arose earlier in the present discussion in relation to step 316 of FIG. 3b. Individual observations may be statistically aggregated, and the individual observations are then discarded, often leading to very large savings in storage and processing power (both in creating and in using the hierarchical profile). Thus, the original observational data set of step 300 of FIG. 3a may no longer be available in its entirety for re-analysis.

It is also possible that recreating the hierarchical profile from scratch may not be feasible from a computational-resource standpoint, even if all of the original data are still available. It may simply take too much processing power to repeatedly recreate the profile, especially for a large profile with frequent updates.

Fortunately, the hierarchical profile can generally be updated without being recreated. Each new observation is compared against the existing profile. When the appropriate place is found in the profile, the new observation is added to the existing structure. Sometimes, this involves simply adding a new node at the bottom of the existing hierarchical structure. Sometimes, as in the case of step 504b, the new observation can be included simply by changing the statistical weight of the appropriate node. By doing this, the existing node is made to represent the new observation along with whatever observations it already represented, with the weight giving the significance of the observations. (See also the discussion above of step 316 of FIG. 3b where a node is created to represent an aggregation of observational data.)

Sometimes, the new observations are significantly different from the observations already represented by the existing hierarchical profile. In that case, when the new observations are compared against the existing profile, it is found that the new observations do not fit so easily within the existing structure. In step 504c, the structure of the hierarchy changes to accommodate the new observations. That is, existing nodes may have their ranking of "statistical informativeness" altered (see the discussion of step 306 of FIG. 3a). The hierarchical structure is altered as these nodes are moved to their new locations, based on the sum total of the observations. The existing structure of the hierarchy maintains enough statistical information that these moves can generally be accomplished, even when some of the original observations are no longer available for re-analysis.

The discussion above of steps 504b and 504c leads to an intriguing possibility. If the addition of new observations causes the hierarchical structure of the profile to change significantly, then it is possible that something interesting has changed with respect to the profiled entity. That possibility is considered in the method of FIG. 6.

The method begins in step 600a when a change in the profile is detected. Generally this change occurs when new observations become available and are added to the profile using the method of FIG. 5. Step 600a could also be triggered when old observations are deleted as no longer relevant, and the deletion causes a change in the profile. (See the discussion of step 504a of FIG. 5.)

Steps 600b through 600e list some of the specific changes in the profile that may be detected in step 600a. These structural elements are all discussed above in relation to FIG. 3.

The detected change triggers an action in step 602. Many possible actions are available depending upon the nature and magnitude of the detected change. As a simple example, if the user 102 has begun visiting web sites of retailers who sell snow blowers, then an advertisement for a sponsor's snow blower can be sent. Similarly, a health recommendation can be made for the user 102. The detected change can also be used to update analytics about the profiled user. If the profiled entity is a large group of people, then the change can indicate a new social phenomenon: With a very large set of observations made of a large number of people, the spread of a disease may be discernable, for example.

The discussion above concerning domains (with reference to step 310 of FIG. 3) raises the possibility that a single hierarchical profile can cover more than one domain. In some situations, a cross-domain profile is created ab initio from all of the observations collected from all of the domains, using the techniques described above.

Figure 7:
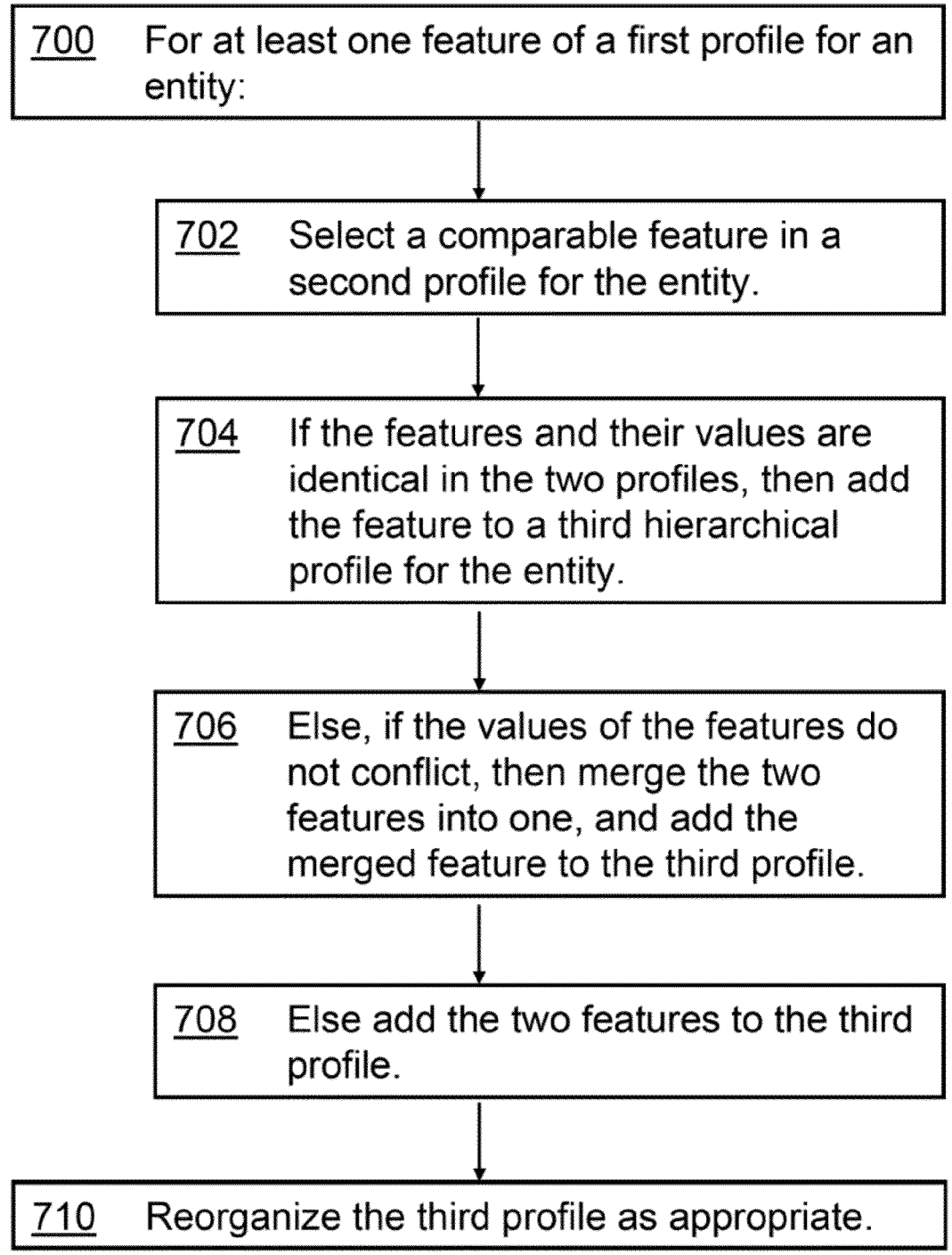
FIG. 7 is a flowchart of a representational method for merging two hierarchical profiles.

In other situations, it is more convenient to first create separate profiles for the entity, one profile for each domain, and then to merge the separate profiles. (For example, the collection of observations may proceed strictly by domain, and the decision to create a unified, cross-domain profile may be made only after separate profiles are created.) FIG. 7 presents a method for merging two pre-existing hierarchical profiles. In the method, a feature of the first profile is selected in step 700. (The statistically most informative feature of the first profile is, of course, the root node, so it would often make sense to start with that node. The method of FIG. 7 does not require that choice, however.)

In step 702, a comparable feature is found in the second profile. In the simplest case, the features from the two profiles are the same (e.g., they are both "color preference"). More generally, the two features are comparable if they differ in meaning by less than a threshold amount. Note that in general, it is the features that are comparable in step 702; the specific values of those features are not considered when judging comparability.

In step 704, the values of the comparable features are compared. In the simplest case, the values are identical in the two pre-existing profiles. Then, the feature with its values is simply copied into the merged profile being created.

Generally, however, the values of the features do not have to be identical, because the entity need not be exactly consistent across domains. If the values differ, but do not actually conflict, then, in step 706, the values are merged under the feature, and the feature with its merged values is added to the new profile. For example, when the feature is "color preference," the value "likes black" in one profile does not conflict with the value "likes red" in the other profile, so the merging can take place.

Sometimes, the values in the separate domains actually conflict. This is not as odd as it may seem because a person may like to watch movies when in the home domain but only listens to music when driving. When conflicting values are found in step 708, copies of the two features with their values are added to the new profile. That is, no merging takes place for these features.

The method of FIG. 7 shows how to merge one feature from each of two pre-existing profiles. It is clearly extendable to more features and to more profiles. In the limit, all of the features of all of the pre-existing profiles are processed, merged where possible into the new profile, and simply added to the new profile when feature merging is not feasible. A limit can be set on the new profile so that not all features of the pre-existing profiles need be examined.

Step 710 raises an important caveat. As each pre-existing hierarchical profile was presumably created by the techniques given above, the features in each profile are arranged by how statistically informative they are. That hierarchy need not be identical across domains, however: One feature may be very informative in one domain but of little value in another. Thus, the newly created profile may need to be reorganized so that its hierarchy reflects all of the information now contained in it. Step 710 can be performed after all of the individual features have been merged. It is also possible to perform the reorganization at the same time that the features are being merged. In this case, the "informativeness" of the selected features is considered, and the output of steps 704 through 708 is immediately placed in the proper place in the hierarchy of the newly forming profile.

In some situations, the method of FIG. 7 can be replaced by the methods given above for adding new observations to an existing profile. That is, if enough of the original observational data are available, then the second profile can be considered as a bundle of new observations to add to the existing first profile. (See the above discussion referring to FIG. 5.)

In view of the many possible embodiments to which the principles of the present invention may be applied, it should be recognized that the embodiments described herein with respect to the drawing figures are meant to be illustrative only and should not be taken as limiting the scope of the invention. For example, any type of observational data collected about any type of entity can be profiled. Therefore, the invention as described herein contemplates all such embodiments as may come within the scope of the following claims and equivalents thereof.

We claim:

1. A computer-implemented method for creating a hierarchical profile for an entity, the method comprising:
    collecting, by one or more computing devices, behavioral data associated with the entity;
    identifying, by the one or more computing devices, a plurality of features of the collected data;
    based, at least in part, on an analysis of at least a portion of the collected behavioral data, selecting, by the one or more computing devices, a first feature of the identified features, wherein the first feature is selected as the statistically most informative feature of the analyzed behavioral data based at least in part on statistical weights respectively associated with the identified features;
    based, at least in part, on an analysis of at least a portion of the collected behavioral data, selecting, by the one or more computing devices, a plurality of values for the selected first feature;
    creating, by the one or more computing devices, a first hierarchical preference level in the profile, the first level based, at least in part, on the selected first feature that is statistically most informative and the selected values for the selected first feature;
    defining a coverage criterion for the profile;
    based, at least in part, on an analysis of at least a portion of the collected behavioral data, selecting, by the one or more computing devices, a second feature of the identified features, the second feature distinct from the first feature;
    based, at least in part, on an analysis of at least a portion of the collected behavioral data, selecting, by the one or more computing devices, a plurality of values for the selected second feature;
    creating, by the one or more computing devices, a second hierarchical preference level in the profile, the second level based, at least in part, on the selected second feature and the selected values for the selected second feature; and
    repeating the selecting and creating steps with distinct features until the coverage criterion is satisfied.

2. The method of claim 1 wherein the one or more computing devices are selected from the group consisting of: a compute server, a coordinated group of compute servers, and a personal electronic device.

3. The method of claim 1 wherein the entity is selected from the group consisting of: a person, a plurality of persons, a corporate entity, a social network of persons, a group of persons defined by a shared contextual attribute, and an entity defined by a collection rule.

4. The method of claim 1 wherein the behavioral data comprise an element selected from the group consisting of: a preference explicitly stated by the entity, a preference explicitly stated by something other than the entity, passive usage data, passive contextual data, and a statistical aggregation of behavioral data.

5. The method of claim 1 wherein the behavioral data are filtered by a contextual attribute.

6. The method of claim 1 wherein the plurality of values are selected as the statistically most informative values of the selected first feature of the analyzed behavioral data.

7. The method of claim 1 wherein at least one node in the profile is further based, at least in part, on an application of a rule.

8. The method of claim 1 wherein at least one node in the profile comprises a statistical aggregation of at least a portion of the collected behavioral data.

9. The method of claim 1 wherein at least one node in the profile comprises a plurality of features.

10. The method of claim 1 wherein the coverage criterion is selected from the group consisting of: an amount of the collected behavioral data covered by the profile and a number of hierarchical preference levels of the profile.

11. The method of claim 1 wherein the second feature is selected as the statistically most informative feature, after the first selected feature, of the analyzed behavioral data.

12. The method of claim 1 further comprising:
    based, at least in part, on an analysis of at least a portion of the collected behavioral data, selecting, by the one or more computing devices, the entity to profile.

13. The method of claim 1 further comprising:
    presenting, by the one or more computing devices, at least a portion of the profile to a user;
    receiving, by the one or more computing devices, a profile modification from the user; and
    modifying, by the one or more computing devices, the profile, the modifying based, at least in part, on the received profile modification.

14. The method of claim 13 wherein the received profile modification comprises a rule.

15. The method of claim 1 further comprising:
    selecting a second and a third feature of the identified plurality of features, wherein the selected second and third features are comparable and wherein a degree of overlap of coverages of the second and third features exceeds a threshold; and
    replacing the second and third features in an analysis of at least a portion of the collected behavioral data with a combination of the second and third features.

16. The method of claim 1 further comprising:
sending, by the one or more computing devices to a second computing device distinct from the first computing device, the created hierarchical profile.

17. A first computing device configured for creating a hierarchical profile for an entity, the first computing device comprising:
a transceiver configured for collecting behavioral data associated with the entity; and
a processor operatively connected to the transceiver and configured for:
identifying a plurality of features of the collected data;
based, at least in part, on an analysis of at least a portion of the collected behavioral data, selecting a first feature of the identified features, wherein the first feature is selected as the statistically most informative feature of the analyzed behavioral data based at least in part on statistical weights respectively associated with the identified features;
based, at least in part, on an analysis of at least a portion of the collected behavioral data, selecting a plurality of values for the selected first feature;
creating a first hierarchical preference level in the profile, the first level based, at least in part, on the selected first feature that is statistically most informative and the selected values for the selected first feature;
defining a coverage criterion for the profile;
based, at least in part, on an analysis of at least a portion of the collected behavioral data, selecting a second feature of the identified features, the second feature distinct from the first feature;
based, at least in part, on an analysis of at least a portion of the collected behavioral data, selecting a plurality of values for the selected second feature;
creating a second hierarchical preference level in the profile, the second level based, at least in part, on the selected second feature and the selected values for the selected second feature; and
repeating the selecting and creating steps with distinct features until the coverage criterion is satisfied.

18. The first computing device of claim 17 wherein the first computing device is selected from the group consisting of: a compute server, a coordinated group of compute servers, and a personal electronic device.

19. The first computing device of claim 17 wherein the entity is selected from the group consisting of: a person, a plurality of persons, a corporate entity, a social network of persons, a group of persons defined by a shared contextual attribute, and an entity defined by a collection rule.

20. The first computing device of claim 17 wherein the behavioral data comprise an element selected from the group consisting of: a preference explicitly stated by the entity, a preference explicitly stated by something other than the entity, passive usage data, passive contextual data, and a statistical aggregation of behavioral data.

21. The first computing device of claim 17 wherein the behavioral data are filtered by a contextual attribute.

22. The first computing device of claim 17 wherein the plurality of values are selected as the statistically most informative values of the selected first feature of the analyzed behavioral data.

23. The first computing device of claim 17 wherein at least one node in the profile is further based, at least in part, on an application of a rule.

24. The first computing device of claim 17 wherein at least one node in the profile comprises a statistical aggregation of at least a portion of the collected behavioral data.

25. The first computing device of claim 17 wherein at least one node in the profile comprises a plurality of features.

26. The first computing device of claim 17 wherein the coverage criterion is selected from the group consisting of: an amount of the collected behavioral data covered by the profile and a number of hierarchical preference levels of the profile.

27. The first computing device of claim 17 wherein the second feature is selected as the statistically most informative feature, after the first selected feature, of the analyzed behavioral data.

28. The first computing device of claim 17 wherein the processor is further configured for:
based, at least in part, on an analysis of at least a portion of the collected behavioral data, selecting the entity to profile.

29. The first computing device of claim 17 wherein the processor is further configured for:
presenting at least a portion of the profile to a user;
receiving a profile modification from the user; and
modifying the profile, the modifying based, at least in part, on the received profile modification.

30. The first computing device of claim 29 wherein the received profile modification comprises a rule.

31. The first computing device of claim 17 wherein the processor is further configured for:
selecting a second and a third feature of the identified plurality of features, wherein the selected second and third features are comparable and wherein a degree of overlap of coverages of the second and third features exceeds a threshold; and
replacing the second and third features in an analysis of at least a portion of the collected behavioral data with a combination of the second and third features.

32. The first computing device of claim 17 wherein the processor is further configured for:
sending, via the transceiver to a second computing device distinct from the first computing device, the created hierarchical profile.

* * * * *